United States Patent
Dau et al.

(10) Patent No.: US 8,573,823 B2
(45) Date of Patent: Nov. 5, 2013

(54) SOLID-STATE LUMINAIRE

(75) Inventors: Wilson Dau, Calgary (CA); Robert Gardner, Atherton, CA (US); George Lerman, Las Vegas, NV (US); Louis Lerman, Las Vegas, NV (US); Chris Lowery, Fall River Mills, CA (US); Brian D. Ogonowsky, Mountain View, CA (US); George E. Smith, Sunnyvale, CA (US); Ingo Speier, Saanichton (CA); Robert Steele, Redwood City, CA (US); Jacqueline Teng, White Salmon, WA (US); Allan Brent York, Langley (CA)

(73) Assignee: Quarkstar LLC, Las Vegas, NV (US)

( * ) Notice: Subject to any disclaimer, the term of this patent is extended or adjusted under 35 U.S.C. 154(b) by 78 days.

(21) Appl. No.: 13/205,548

(22) Filed: Aug. 8, 2011

(65) Prior Publication Data

US 2013/0039050 A1    Feb. 14, 2013

(51) Int. Cl.
    *F21V 7/04* (2006.01)
(52) U.S. Cl.
    USPC .......................................... 362/560; 362/222
(58) Field of Classification Search
    USPC ............ 362/555, 558, 560, 222–225, 217.04, 362/217.05, 311.06
    See application file for complete search history.

(56) References Cited

U.S. PATENT DOCUMENTS

| | | |
|---|---|---|
| 2,194,841 A | 3/1940 | Welch |
| 3,772,506 A | 11/1973 | Junginger |
| 3,836,767 A | 9/1974 | Lasker |
| 4,112,483 A | 9/1978 | Small et al. |
| 4,254,456 A | 3/1981 | Grindle et al. |
| 4,271,408 A | 6/1981 | Teshima et al. |
| 5,075,827 A | 12/1991 | Smith |
| 5,134,550 A | 7/1992 | Young |
| 5,289,356 A | 2/1994 | Winston |
| 5,438,485 A | 8/1995 | Li et al. |
| 5,810,463 A * | 9/1998 | Kawahara et al. ............ 362/601 |
| 5,988,836 A | 11/1999 | Swarens |
| 6,058,271 A | 5/2000 | Tenmyo |
| 6,441,943 B1 | 8/2002 | Roberts et al. |

(Continued)

FOREIGN PATENT DOCUMENTS

EP    1182395    2/2002

OTHER PUBLICATIONS

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

(Continued)

*Primary Examiner* — Julie Shallenberger
(74) *Attorney, Agent, or Firm* — Fish & Richardson P.C.

(57) ABSTRACT

In one embodiment, a solid-state luminaire has a strip of high power LEDs, where each LED emits light into an optical coupler. Light from the optical coupler is then coupled into a light guide. Light coupled into the light guide is mixed and guided to an exit aperture of the light guide. An optical extractor proximate the exit aperture of the light guide redirects light outward, which is optionally redirected generally downward by a secondary reflector that extends outwardly along the length of the light guide. The secondary reflector may be configured to create a variety of light-emission patterns. The luminaire may be hung from a ceiling, in track lighting, used as a pendant or pedestal fixture, or in other applications.

27 Claims, 10 Drawing Sheets

(56) References Cited

U.S. PATENT DOCUMENTS

| | | |
|---|---|---|
| 6,505,953 B1 | 1/2003 | Dahlen |
| 6,527,420 B1 | 3/2003 | Chuang |
| 6,543,911 B1 | 4/2003 | Rizkin et al. |
| 6,572,246 B1 | 6/2003 | Hopp et al. |
| 6,598,998 B2 | 7/2003 | West et al. |
| 6,932,499 B2 | 8/2005 | Ogura |
| 7,083,315 B2 | 8/2006 | Hansler et al. |
| 7,097,337 B2 | 8/2006 | Kim et al. |
| 7,156,540 B2 | 1/2007 | Haines |
| 7,164,842 B2 | 1/2007 | Chen |
| 7,182,480 B2 | 2/2007 | Kan |
| 7,259,403 B2 | 8/2007 | Shimizu et al. |
| 7,275,841 B2 | 10/2007 | Kelly |
| 7,334,932 B2 | 2/2008 | Klettke |
| 7,386,214 B1 | 6/2008 | Canciotto |
| 7,387,399 B2 | 6/2008 | Noh et al. |
| 7,530,712 B2 | 5/2009 | Lin et al. |
| 7,645,054 B2 | 1/2010 | Goihl |
| 7,850,347 B2 | 12/2010 | Speier et al. |
| 7,855,815 B2 * | 12/2010 | Hayashide et al. ........... 358/484 |
| 7,942,546 B2 | 5/2011 | Naijo et al. |
| 7,947,915 B2 | 5/2011 | Lee et al. |
| 7,967,477 B2 | 6/2011 | Bloemen et al. |
| 8,002,446 B1 | 8/2011 | Plunk et al. |
| 8,061,867 B2 | 11/2011 | Kim et al. |
| 8,075,147 B2 | 12/2011 | Chaves et al. |
| 8,348,489 B2 | 1/2013 | Holman et al. |
| 2004/0012976 A1 | 1/2004 | Amano |
| 2004/0080947 A1 | 4/2004 | Subisak et al. |
| 2004/0105264 A1 | 6/2004 | Spero |
| 2004/0137189 A1 | 7/2004 | Tellini et al. |
| 2004/0228131 A1 | 11/2004 | Minano et al. |
| 2005/0111235 A1 | 5/2005 | Suzuki et al. |
| 2005/0265044 A1 | 12/2005 | Chen et al. |
| 2005/0270774 A1 | 12/2005 | Pan |
| 2006/0061990 A1 | 3/2006 | Chinniah et al. |
| 2006/0076568 A1 | 4/2006 | Keller et al. |
| 2006/0139917 A1 | 6/2006 | Ward |
| 2006/0187661 A1 | 8/2006 | Holten |
| 2007/0061360 A1 | 3/2007 | Holcombe et al. |
| 2007/0081360 A1 | 4/2007 | Bailey et al. |
| 2007/0097696 A1 * | 5/2007 | Eng et al. ..................... 362/341 |
| 2007/0201234 A1 | 8/2007 | Ottermann |
| 2007/0280593 A1 | 12/2007 | Brychell et al. |
| 2008/0074752 A1 | 3/2008 | Chaves et al. |
| 2008/0198603 A1 | 8/2008 | Sormani et al. |
| 2009/0103293 A1 * | 4/2009 | Harbers et al. ................ 362/231 |
| 2009/0168395 A1 * | 7/2009 | Mrakovich et al. ............. 362/84 |
| 2009/0231878 A1 * | 9/2009 | Van Duijneveldt .......... 362/555 |
| 2011/0182084 A1 | 7/2011 | Tomlinson |
| 2011/0227487 A1 | 9/2011 | Nichol et al. |
| 2011/0267836 A1 | 11/2011 | Boonekamp et al. |
| 2012/0044675 A1 | 2/2012 | Buelow et al. |
| 2012/0147624 A1 | 6/2012 | Li et al. |
| 2012/0155116 A1 | 6/2012 | Gardner |
| 2012/0170260 A1 | 7/2012 | Gardner |
| 2012/0268966 A1 | 10/2012 | McCollum et al. |
| 2012/0281432 A1 | 11/2012 | Parker et al. |
| 2012/0294037 A1 | 11/2012 | Holman et al. |

OTHER PUBLICATIONS

Young, "International Search Report and Written Opinion" from co-pending PCT Application No. PCT/US12/50046 dated Oct. 26, 2012, 34 pages.

U.S. Appl. No. 13/570,243, filed Aug. 8, 2012, Illumination Devices Including Multiple Light Emitting Elements, Dau et al.

U.S. Appl. No. 13/611,738, filed Sep. 12, 2012, Illumination Devices Including Multiple Light Emitting Elements, Dau et al.

U.S. Appl. No. 13/611,871, filed Sep. 12, 2012, Illumination Devices Including Multiple Light Emitting Elements, Dau et al.

Thomas, "International Search Report and Written Opinion" from co-pending PCT Application No. PCT/US13/24525 dated Apr. 16, 2013, 16 pages.

* cited by examiner

SOLID-STATE LUMINAIRE

TECHNICAL FIELD

The present technology pertains in general to lighting and more particularly to the configuration of a solid-state luminaire for providing ambient illumination.

BACKGROUND

A huge market for LEDs is in luminaires for general lighting. Using LED luminaires instead of incandescent luminaires or fluorescent luminaires has well known energy benefits as well as overall quality-of-light benefits.

It is well known to couple LEDs to a narrow edge of a transparent acrylic light guide and roughen the light output surface of the light guide, or provide microlenses on the surface of the light guide, to allow the light to leak out the large surface of the light guide. Total internal reflection (TIR) keeps the light in the light guide until the light impinges on the surface feature at less than the critical angle for exiting the light guide. For example, LED luminaires have been optically coupled to the edges of an acrylic sheet with etched patterns for display signage and for backlighting applications. The advent of high power LEDs in the late 1990's prompted increased implementations of this technology by virtue of the much higher flux densities available from these more powerful and efficient LEDs.

The light guide may be used as a ceiling panel to provide general lighting for a room. Such luminaires have emission patterns that are difficult or impossible to optimize for overhead general lighting where glare (direct view by observers) and industry requirements dictate the emission specifications for such lighting.

Color and brightness uniformity is a desired feature in such overhead lighting. Color uniformity is difficult when using a plurality of phosphor-converted LEDs that generate white light. This is because LEDs, even from a single wafer, have a range of peak wavelengths, and it is difficult to provide the optimal phosphor combinations and uniformity of application process to cause all the LEDs to output light having the same chromaticity (e.g., white point, or correlated color temperature, or spectral power distribution).

Therefore, what is needed in the lighting industry is a solid-state luminaire that overcomes at least one of the deficiencies of the state-of-the art.

This background information is provided to reveal information believed by the applicant to be of possible relevance to the present technology. No admission is necessarily intended, nor should be construed, that any of the preceding information constitutes prior art against the present technology.

SUMMARY

An object of the present technology is to provide a solid-state luminaire having light guide and secondary reflector. In accordance with one aspect of the present technology, there is provided a luminaire comprising a plurality of light-emitting diodes (LEDs) operatively disposed in an elongate configuration; one or more optical couplers optically coupled with the plurality of LEDs and configured to receive at least a portion of light from the plurality of LEDs, each optical coupler configured to at least partially collimate light from the plurality of LEDs; a light guide optically coupled with the one or more optical couplers and configured to receive at least a portion of light from the one or more optical couplers, the light guide configured to guide at least a portion of light from the one or more optical couplers from a first end toward a second end of the light guide; and an optical extractor optically coupled to the light guide proximate the second end of the light guide, the optical extractor configured to redirect and emit at least a portion of light from the light guide.

In accordance with another aspect of the present technology, there is provided a method for manipulating light in a luminaire, the method comprising providing light from one or more light-emitting diodes (LEDs); collimating, in one or more optical couplers, the light from the one or more LEDs to provide at least partially collimated light; guiding the at least partially collimated light from a first end to a second end of a light guide optically coupled to the one or more optical couplers to provide guided light at the second end; and extracting at least a portion of the guided light with an optical extractor optically coupled to the light guide to provide emitted light emitted away from an optical axis of the light guide.

BRIEF DESCRIPTION OF THE DRAWINGS

Elements that are the same or similar in the various figures are identified with the same reference numeral.

DETAILED DESCRIPTION

Definitions

Figure 1:
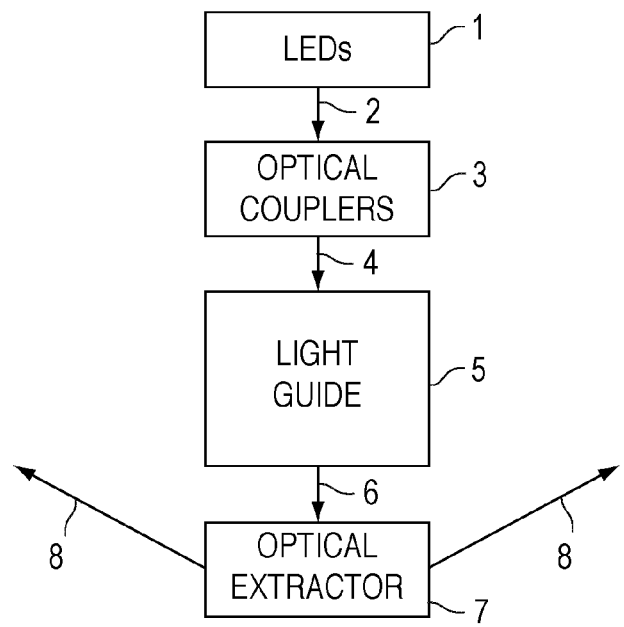
FIG. 1 illustrates a block diagram of a luminaire according to embodiments of the present technology.

The term "optical axis" is used herein to refer to an imaginary line or plane that defines a path along or proximate which light propagates. An optical axis may correlate with one or more axes or planes of symmetry of components of an optical system or apparatus.

The terms "collimation" and "collimate" are used herein to refer to the degree of alignment of rays of light or the act of improving such alignment including the reduction of divergence of the propagation directions of a plurality of light rays, also referred to as a beam of light.

The terms "phosphor" or "wavelength-conversion material" are used herein interchangeably to refer to a material that can convert light of one or more first wavelengths into light of one or more second wavelengths with one or more photon conversion efficiencies. This includes material that can convert a photon having a first wavelength into two or more photons having one or more second wavelengths, for example. A phosphor can comprise Ce:YAG, TAG, nitride, oxynitride, silicate, CdSe quantum dot material, AlInGaP quantum dot material or other phosphors. A phosphor may be configured to generate longer wavelength light from visible light or ultraviolet light, for example. Different phosphors may have different first wavelengths and/or different second wavelengths.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

According to embodiments, the luminaire is configured to manipulate light provided by one or more light-emitting diodes (LEDs) by at least partially collimating the light that passes through one or more optical couplers. The collimated light is characterized by a first emission pattern. The partially collimated light is then guided along an optical axis of the light guide from a first end of the light guide to a distal position away from the one or more LEDs and provided as guided light to the distal position. The guided light is then extracted by an optical extractor. The optical extractor is optically coupled to a second side of the light guide. The optical extractor provides emitted light that is emitted away from the optical axis and has a second emission pattern. The emitted light may be considered comprising one or more beams of light having one or more light-emission patterns.

Depending on the embodiment, at least a portion of the extracted light may be provided without further impediment by the luminaire or optionally redirected by an optional secondary reflector. Depending on the embodiment, wavelength-conversion material may be included in the luminaire at one or more locations in order to convert at least a portion of light depending on wavelength.

According to embodiments of the present technology and as schematically illustrated in FIG. 1, a solid-state luminaire includes one or more LEDs 1, one or more optical couplers 3, a light guide 5, and an optical extractor 7. Depending on the embodiment, the luminaire optionally comprises a secondary reflector (not illustrated). Light 2 emitted by the LEDs under operating conditions is coupled into the one or more optical couplers, which are configured to at least partially collimate the light into one or more beams of light 4 that each diverge into a narrower predetermined solid angle in comparison to the light 2 that enters the corresponding optical coupler. Light 4 from the one or more optical couplers is then coupled into the light guide. The light guide directs the light along an optical axis so it can propagate away from the LEDs and the optical couplers towards and provide light 6 to the optical extractor. The optical extractor is optically coupled to the light guide and configured to extract light 8 from the luminaire. Depending on the embodiment, light 8 may be emitted from the luminaire in a symmetrical or asymmetrical manner with respect to one or more optical axes (not illustrated) of components of the luminaire. Two or more of such optical axes may be parallel and/or collinear.

Depending on the embodiment, a luminaire may comprise one or more luminaires as described herein. That is a luminaire may include one or more units, wherein each unit comprises one or more LEDs 1, one or more optical couplers 3, a light guide 5, an optical extractor 7, and an optional secondary reflector. Depending on the embodiment, two or more such units may have one or more common components or one or more separate components. Common components may include one or more LEDs 1, one or more optical couplers 3, a light guide 5, an optical extractor 7, a secondary reflector, and/or other components.

It is noted that, depending on the embodiment, two or more of the optical couplers, the light guide, and/or the optical extractor may be integrally formed into one or more integrally formed elements. In such a case, it is understood, that corresponding terms including optical coupler, light guide, optical extractor and/or other components may refer to portions of the corresponding integrally formed elements.

Depending on the embodiment, two or more of the one or more optical couplers, light guide, optical extractor and/or other components of the luminaire may be modularly configured. Modularly configured components of the luminaire may include or be configured for operative interconnection with suitably formed interconnection elements (not illustrated) configured to facilitate registration, assembly and/or disassembly during manufacture, field servicing, or other events, for example.

According to embodiments, the combination of one or more optical couplers, a light guide and an optical extractor allows for transporting light to a distal position away from the LEDs before emission into the ambient. The spatial separation of the place of generation of the light, also referred to as the physical (light) source, from the place of extraction of the light, also referred to as the optical or virtual light source can facilitate design of the luminaire. The virtual light source may be viewed as one or more portions of space from which substantial amounts of light appear to emanate. Furthermore, separating the LEDs, with their predetermined optical, thermal, electrical and mechanical constraints, from the place of light extraction, facilitates a greater degree of design freedom of the optical system of the luminaire and allows for an extended optical path, which may in turn permit a predetermined level of light mixing before light is emitted from the luminaire. Luminaire according to embodiments may be configured to provide predetermined illumination with good aesthetics that may be useful for a wide range of lighting applications.

Depending on the embodiment, the virtual light source may include one or more elongate regions of space, which may be referred to as a substantially one-dimensional light source, linear light source or a virtual filament, for example. Such terms may also be used interchangeably with the term optical extractor.

Optical Couplers

Depending on the embodiment, a luminaire may comprise one or more optical couplers. One or more of the optical couplers may be integrally formed and have a symmetrical or asymmetrical configuration, for example. Each optical coupler is configured to receive a predetermined amount of light from one or more LEDs that are suitably disposed at an entrance aperture of the optical coupler and provide a predetermined amount of light to an exit aperture of the optical coupler to which the light guide is operatively coupled. For this purpose each optical coupler is optically coupled with the corresponding LEDs and the light guide. Depending on the embodiment, adjacent optical couplers may be optically isolated or optically coupled in a predetermined manner to provide predetermined collimation of or other functions to light coupled from the LEDs in one or more planes parallel to the optical axes of the optical couplers.

According to embodiments, the optical coupler is configured so that a predetermined amount of light from one or more of the LEDs is coupled into the optical coupler and a predetermined amount of that light is provided at an exit aperture by the optical coupler. The optical coupler is configured to transform light as it undergoes interactions therewith between the entrance aperture and the exit aperture. Depending on the embodiment, the optical coupler may be configured to perform one or more transformations of the phase space of the light emission including collimation of light. Such transformations may be configured to preserve Etendue, light flux and/or other parameters, for example. Depending on the embodiment, the optical coupler may be configured to provide light at its exit aperture that can propagate in such a manner that limits light losses in other components of the luminaire, including one or more of the light guide, extractor, secondary reflector or other component, for example.

Depending on the embodiment, an optical coupler may comprise one or more optical elements including non-imaging dielectric TIR concentrators, such as CPC (compound parabolic concentrators), CECs (compound elliptical concentrators), CHC (compound hyperbolic concentrators), tapered or untapered portions, light pipes, segmented concentrators, other geometry concentrators, one or more lenses or other optical elements, for example.

Depending on the embodiment, two or more of the optical couplers may have nominally equal or different configurations. Optical couplers may have equal or different profiles or cross sections in different directions. An optical coupler may be rotationally symmetric or asymmetric about its optical axis, for example it may have a parabolic, elliptical, circular, hyperbolic, regular or irregular polygonal or other cross sections. An optical coupler may have circular, elliptical triangular, square, rectangular, hexagonal, multi-segment or other cross-sections.

An optical coupler may comprise a solid transparent material and solely rely on TIR or may be partially or fully reflectively coated on all surfaces except the entrance and exit apertures. Depending on the embodiment, one or more optical couplers may be configured as a hollow, reflectively coated non-imaging optical couplers. One or more of the optical couplers may include a dielectric collimating optic configured to provide a predetermined collimation angle at a predetermined length of the optical coupler. An optical coupler may be designed to provide substantially equal collimation in all directions or may provide different collimation in different directions perpendicular and/or along the light guide.

Depending on the embodiment, light provided by an optical coupler in directions that are substantially non-perpendicular to an elongate extension of a luminaire may propagate through substantial portions of the light guide and the optical extractor in such directions, for example, when the light guide and the optical extractor are optically invariant under translations along the extension of an elongate luminaire. In such embodiments, adequate configuration of the optical coupler(s) may aid in providing adequate collimation of light along the extension of elongate luminaires to provide predetermined propagation of light within the optical components thereof. It is noted that propagation of light perpendicular to the extension of an elongate luminaire can be determined by the design of the optical couplers, the light guide, the optical extractor, and, if provided, by the optional secondary reflector.

Light Guide

Depending on the embodiment, the light guide may comprise one or more predetermined light-guide elements, each having a generally regular or irregular prismatic, cylindrical, cuboid or other shape, which may be immediately adjacent or placed apart at predetermined distances. Light-guide elements may be integrally formed, modularly configured, arranged and/or durably disposed via a suitably configured interconnect system during manufacture, installation, servicing or other event. One or more light-guide elements may be configured to have one or more substantially reflective surfaces defining a mantle that extends from a first end to a second end of the light guide for enclosing and enabling optical confinement proximate an optical axis along which the light guide can guide light with below predetermined light losses. Depending on the embodiment, one or more pairs of surfaces of the mantle may be substantially parallel, tapered or otherwise arranged. Depending on the embodiment, the mantle may comprise substantially flat or curved reflective surfaces. Depending on the embodiment, the light guide may have an elongate or substantially cylindrical cross section perpendicular to its optical axis.

According to an embodiment, the light guide is configured as a single substantially cuboid body. Light emitted from the LEDs, preconditioned by the optical coupler and coupled into the light guide reflects off the parallel internal surfaces of the light guide, for example, by total internal reflection (TIR) and mixes in the light guide. The light guide may be configured to intermix light from different LEDs. According to an embodiment, the light guide may be configured to mix light and to provide light with a predetermined uniformity in color and/or brightness to the optical extractor.

According to an embodiment, the light guide may be hollow having a reflective coating on its inside providing a hollow light guide that can transmit light along its length with predetermined light-loss properties.

Optical Extractor

The optical extractor is configured to provide one or more reflective interfaces that redirect light from the light guide outward away from the optical axis of the light guide towards and through one or more light-exit surfaces of the optical extractor into the ambient. Depending on the embodiment, components of the directions of propagation of the emitted light may be parallel or antiparallel to the optical axis of the light guide. For example, different portions of light emitted from the optical extractor may propagate upwards towards a ceiling or downwards towards the surface of a table, for example, depending on the configuration, orientation and/or application of the luminaire. The configuration of the optical extractor may depend on the configuration of other components of the luminaire including the optical couplers, light guide or other components.

Depending on the embodiment, the optical extractor may be configured to emit one or more beams of light with predetermined light-emission patterns. For example, different light-emission patterns may be provided via different light-exit surfaces. The optical extractor and/or one or more portions thereof from which light appears to emanate under operating conditions may be referred to as a virtual light source. According to embodiments, the virtual light source has an elongate configuration. One or more of the light-emission patterns may be configured to limit glare and/or direct downward lighting to corresponding predetermined levels, for example.

According to embodiments, the light-emission pattern of the optical extractor, at least in part, is determined by the configuration and disposition of the reflective interfaces relative to the light-exit surfaces of the optical extractor. Depending on the embodiment, the optical extractor may include one or more reflective interfaces having one or more flat or predetermined curved shapes including parabolic, hyperbolic, circular, elliptical or other shapes. Depending on the embodiment, the optical extractor may comprise one or more reflective coatings to redirect light and provide a desired emission pattern. Depending on the embodiment the reflective interface may be linear, convex, concave, hyperbolical, or linear segmented cross section in order to achieve the desired emission pattern. Depending on the embodiment the optical extractor may provide symmetrical or asymmetrical beam distributions with respect to an optical axis thereof. Depending on the embodiment, the shapes of reflective interfaces and/or light-exit surfaces may change along the elongation of the optical extractor.

According to an embodiment, the optical extractor may be provided with reflective interfaces defining a symmetrical or asymmetrical V-shaped cross section disposed substantially opposite the light guide. The V-shaped cross section may also be referred to as a V-groove. Depending on the embodiment, the V-groove may extend substantially equal along a length of the optical extractor or it may vary depending on the position along the length. Such variations may be stepwise or continuous.

Depending on the embodiment, the optical extractor may be formed of one or more materials equal, similar or dissimilar to that of the light guide and comprise one or more different materials. Depending on the embodiment, the optical extractor may be configured to redirect light via TIR or otherwise. The optical extractor may comprise one or more coatings including one or more films of suitable dielectric, wavelength conversion or other material. Depending on the embodiment, the optical extractor may be integrally or modularly formed with the light guide. Depending on the embodiment, a modularly formed optical extractor and light guide may include or be interconnected with suitable connectors for durable interconnection and optional registration during manufacture, assembly, service or other event. Modular optical extractors may have different optical configuration to provide different lighting properties.

Depending on the embodiment, each of the light-exit surfaces and/or the reflective interfaces may include one or more segments, each having a predetermined shape including convex, concave, planar or other shape. Shapes of the light-exit surface and/or the reflective interfaces can be determined to provide predetermined levels of light extraction via the optical extractor and to limit light losses due to back reflection and/or absorption of light within the optical extractor.

Depending on the embodiment, reflective interfaces and light-exit surfaces may be configured to substantially adhere to optical principles guided by aspects derived from and/or including that of a Weierstrass Sphere including point-like or elongate configurations, herein generally referred to as a Weierstrass configuration, including spherical, cylindrical or other configurations. Depending on the embodiment, aspects of a Weierstrass configuration may be employed for the configuration of one or more other components of a luminaire, for example, to configure the optical couplers for coupling light from the LEDs or LED dies.

According to some embodiments, one or more light-exit surfaces are optically coupled with one or more reflective interfaces in a cylindrical Weierstrass configuration. For example, the optical extractor is formed of a material with refractive index n and includes at least one light-exit surface that is configured as an elongate, straight, portion of a cylinder mantle of radius R that is disposed so that at least a first portion of an optically coupled reflective interface falls within a portion of space defined by a notional cylinder of radius R/n that is collinear with the cylinder of radius R defining the light-exit surface and reflects light from the light guide thereto. In such a case, light coming from the light guide that is reflected by a first portion of the reflective interface into a solid angle defined by a light-exit surface relative to a corresponding reflective interface can exit through the light-exit surface without total internal reflection.

Secondary Reflector

According to some embodiments, the luminaire includes an optional secondary reflector that is configured to redirect at least a portion of light emitted by the optical extractor. Depending on the embodiment, the secondary reflector may be configured to redirect light via specular and/or diffuse reflection, or in other ways. The secondary reflector is configured in combination with the optical extractor to provide a predetermined illumination. The secondary reflector provides a degree of freedom to the optical design and allows for manipulation of light emitted by the luminaire to provide a predetermined light-emission pattern for illumination that may otherwise be difficult or impossible to achieve. Depending on the embodiment, the secondary reflector may be considered as a modular component of the luminaire that can be used to facilitate selection of a variety of light-emission patterns and therefore generation of lighting conditions, for example, during installation of the luminaire.

According to some embodiments, the secondary reflector may be disposed and configured to substantially extend the full size of the light guide and to at least partially extend over the sides of the light guide. Depending on the embodiment, the secondary reflector may comprise a specular or diffusive reflective surface provided by a sheet of metal, such as aluminum or other metal, or reflective plastic, paint or other coating, for example. Depending on the embodiment, the secondary reflector may allow some light to transmit into the space behind the secondary reflector, for example, for illuminating a ceiling with a correspondingly configured luminaire. The shape of the secondary reflector, such as the angle with respect to the floor, its curvature, and the width of the reflector, can be adapted to generate a predetermined emission pattern for general illumination. Depending on the embodiment, the secondary reflector may comprise one or more reflective surfaces.

According to some embodiments, the secondary reflector may include a layer of phosphor on or below one or more suitably reflective surfaces of the secondary reflector. Depending on the embodiment, the secondary reflector may comprise a translucent material with a wavelength-conversion material in close proximity that may be configured to allow transmission of a portion of light through the secondary reflector to a ceiling or into the ambient behind the secondary reflector. As such the secondary reflector may be configured for direct as well as mixed direct and indirect ambient illumination.

Depending on the embodiment, the secondary reflector may be configured to be angularly and/or vertically adjustable to assist in fine-tuning a variety of light-emission patterns. For this purpose, a luminaire may include one or more hinge or locking mechanisms and/or interconnectors. Corresponding luminaire may provide predetermined functionality and/or modularity to adjustably accommodate different lighting requirements of different sized rooms including hallway, closed and open plan offices, or other spaces, for example.

Further Aspects

Depending on the embodiment, phosphor may be disposed at one or more suitable locations along the optical path, for example, proximate the LEDs, at the distal portion of the light guide, such as in or on the optical extractor or one or more components thereof, or at other locations. Phosphors that are disposed away from the LEDs may be exposed to lower temperatures, which may provide increased photon conversion efficiency and extended useful lifetime of the phosphors. Remote disposition of phosphors may facilitate geometrical as well as other aspects of the luminaire configuration.

Depending on the embodiment, optical components of luminaire may need to be configured to maintain a predetermined degree of operation if substantial amounts of short wavelengths light, for example blue, violet or ultraviolet light, propagate through substantial portions of the optical paths of a luminaire depending. This may depend on the particular locations of phosphors and may require certain optical components to be formed from suitable materials or be otherwise adequately configured. Similar considerations may apply to components that assume high temperatures during operation of the luminaire.

Depending on the embodiment, one or more wavelength-conversion materials may be disposed at multiple locations along the optical path. The one or more wavelength-conversion materials may be disposed in different amounts, concentrations and/or net conversion capabilities at different locations. For example, the luminaire may be configured so that certain portions of the luminaire appear bluish-white while the luminaire provides warm white light for general illumination. As such, predetermined appearances and light-emission patterns may be achieved by adequately positioning one or more wavelength-conversion materials.

According to embodiments, the LEDs are arranged on one or more substrates, each may be elongate or otherwise shaped. The one or more substrates may be disposed on a carrier, for example a strip or otherwise shaped carrier configured to provide mechanical, electrical, thermal and/or optical coupling to the ambient, light guide, optional secondary reflector or other component of the luminaire. The carrier may be configured to provide predetermined mechanical strength, interconnectivity, heat sinking, electrical connection or other functions. Depending on the embodiment, the carrier may be configured to dissipate heat away from LEDs directly or indirectly into the ambient. The secondary reflector may be designed to be in thermal contact with the carrier and provide a large surface area enabling thermal dissipation of the waste heat generated in the LEDs.

According to some embodiments, the luminaire is configured for suspension from a ceiling, wall or other surface of an object, room, or other space. In such a case, the light guide may be disposed substantially vertically, and may be about four feet long, less than one half inch thick, and is two to six inches wide. According to another embodiment, the luminaire can be configured to replace a standard two by two foot or two by four foot recessed fluorescent troffer, for example.

According to some embodiments, a plurality of elongate disposed generally cylindrical light-guide elements may be included in a luminaire. The optical extractor for a corresponding luminaire may have an elongate configuration or comprise a plurality of optical-extractor elements. An optical-extractor element may be configured to substantially create a virtual light source that can emit light radially away from the optical axis of the light guide in at least one or more radial segments or substantially isotropic into 360 degrees. Depending on the embodiment, such luminaires may be used as a desk luminaire, or a ceiling luminaire, with or without an optional secondary reflector. It is understood that dimensions of the light guide may be different from the noted ones depending on the application for which the luminaire is designed.

Manufacturing

Manufacturing of luminaire including the disposition of LED die or packages may be facilitated by employing circuit board assembly techniques and placement machinery processes in combination with one or more processes as described herein.

Depending on the embodiment, LED die or packages may be disposed relative to the optical couplers with predetermined accuracy, for example during manufacture, assembly or other event. Depending on the embodiment differential coefficients of thermal expansion between different materials may be considered during such deposition, for example, if components are manufactured or assembled at different temperatures.

Integral formation of two or more optical components, for example the optical couplers and the light guide or the light guide and extractor may be employed to maintain Fresnel losses that may otherwise occur at optical interfaces at or below predetermined levels. Integral formation can facilitate registration and alignment of respective components of a luminaire.

According to an embodiment, optical couplers may be injection molded in groups of two or more elements and be provided with integral registration elements or receptacles for matingly receiving external registration elements to assure accurate placement of optical couplers relative to suitably disposed LEDs. Registration elements may be configured as indexing pins for insertion into vias provided by a PCB board or LED package, for example. Index matching material such as silicone with suitable optical properties may be disposed to provide a predetermined optical coupling between LEDs and the optical couplers. LED packages may be operatively connected at different stages of the noted process to the optical couplers. Depending on the embodiment, LED packages may be electrically and/or mechanically disposed on a PCB before or after operative interconnection with the optical couplers.

According to some embodiments, optical couplers may be configured to provide one or more receiving apertures, which may be configured to provide tapered inner walls, protrusions, ribs or other elements that provide a predetermined restorative force to the LEDs during the mating procedure so that LEDs and optical couplers can be aligned with predetermined accuracy.

According to some embodiments, LEDs may be placed within recesses provided by optical couplers by automated equipment and centered by tapered walls or ribs to centered positions with a surrounding layer of gel to index match and optionally be cured to set their positions. An optional processing step may then planarize the assembly and remove excess material in preparation for testing and subsequent electrical and mechanical bonding to a substrate.

In another embodiment, the LEDs may be molded within the optical couplers to form assemblies which then can be optionally pre-tested and sorted and then can be aligned to a registration point on the substrate prior to electrical and thermal bonding. A tab or pin on the optical coupler body may be employed that is aligned to the substrate matching detail which also aligns the electrical contact points of the LEDs in the x, y and z axes for electrical and thermal bonding.

In another embodiment, the LEDs may also be affixed or molded within the optical couplers as in the previous embodiment and they are constrained by mating structures in one or more directions by a registration detail in the input side of the light guide prior to the curing of an optical interface material that reduces Fresnel losses at this interface. This alignment would then help constrain alignment of the electrical contact points at the bottom of the LED die or packages to align to a substrate for electrical and thermal bonding.

In another embodiment, the LEDs are mounted on a substrate via a sticky thermal matching gel with a viscous solder paste between their contacts and the substrate such that they can be adjusted minute distances as they are centered within their respective mating recesses within the optical couplers.

The technology will now be described with reference to specific examples. It will be understood that the examples are intended to describe aspects of some embodiments of the technology and are not intended to limit the technology in any way.

EXAMPLES

According to an embodiment of the present technology, an example luminaire has an elongate configuration. Such a luminaire may be configured for suspension from a ceiling, disposition in a cove, wall washer, as a recessed troffer, a replacement for a fluorescent tube or for other applications. The optical performance and spacing requirement of the luminaire may be similar to that of a conventional 2×2 or 2×4 foot fluorescent luminaire. Solid-state lighting can provide a number of benefits over fluorescent bulb lighting, such as better dimming control, more pleasing and controllable color appearance, more environmentally friendly usage and disposal, longer lifetime, potentially smaller size, higher efficiency, and other advantages, for example.

According to an embodiment, the luminaire comprises a plurality of LEDs disposed on one or more elongate substrates operatively disposed in an elongate carrier. According to some embodiments, the carrier is elongate and configured to accept a predetermined number of elongate substrates, each shorter than the carrier. According to some embodiments, the carrier is elongate and configured to accept one elongate substrate, both having substantially equal length. Likewise, the luminaire may be configured to include modules of one or more optical couplers, one or more light guides and/or one or more optical extractors each having an elongate configuration. Depending on the embodiment, various combinations of substrate, optical coupler, light guide and/or optical extractor modules may be configured in form of one or more modules. One or more such modules may be integrally formed.

One or more of the LEDs may be configured to emit white light or light of one or more other colors. Common high power LEDs may, for example, output 100 lumens/watt, or more, and conduct current greater than 350 mA. Such LEDs are typically blue GaN-based LEDs with an overlying phosphor layer (e.g., YAG) that creates yellow or red and green components to produce white light. Such white light LEDs and their configurations are well known.

In one embodiment, the individual LEDs are surface mount devices. The LED strip may comprise readily available white or other chromaticity LED packages, as supplied by, for example, Nichia, Cree, Philips Lumileds, or Osram. Depending on the embodiment, the LED packages may be mounted on one or more printed circuit boards (PCBs), for example, a linear strip of an epoxy glass-PCB, metal core-PCB, or flexible printed circuit, or any other structure capable of providing predetermined mechanical, thermal and/or electrical connections. According to some embodiments, to provide predetermined extraction efficiencies and reduce costs associated with packaging, the LED die (also referred to as LED chips) are unpackaged bare chips. Depending on the embodiment, such chips may be partially or fully encapsulated by one or more materials of suitable optical refractive properties. The expression LED die or LED chips are used interchangeably and have the same meaning in the context of this invention.

Depending on the embodiment, individual LEDs may be configured as readily available LED packages or individual LEDs where the primary light emission is blue or ultraviolet and where the conversion of these wavelengths to the final chromaticity takes place at one or more other locations within the optical path proximate or distal of the LEDs.

Figure 2:
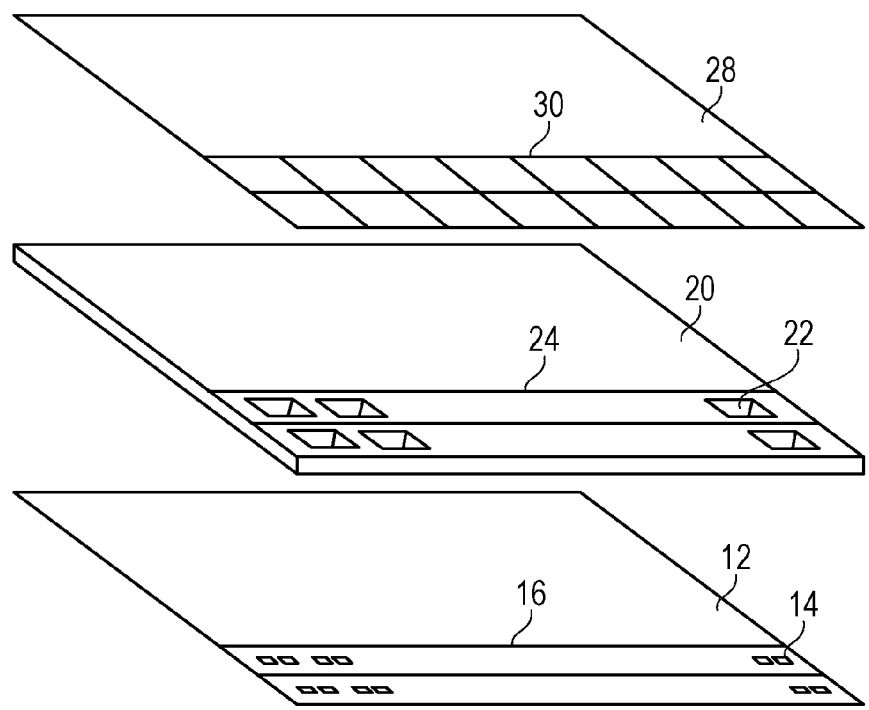
FIG. 2 illustrates a perspective view of three layers used to form LED strips for a luminaire according to embodiments of the present technology.

FIG. 2 illustrates three layers used to form LED strips, prior to singulating the combined layers to create the strips, according to some embodiments. A substrate 12 comprising a printed circuit board (PCB) panel, or other suitable support layer may be configured to provide predetermined electrical, mechanical and thermal properties and interconnect functionalities. The substrate comprises pairs of metal pads 14 for each LED chip and a suitable conductive interconnect systems for interconnecting the LEDs of a strip in a combination of series and parallel circuitry to be driven by a power supply. The power supply for each LED strip or combination of LED strips may be mounted on the substrate 12 or may be a separate module connected to the strip or strips by a suitable connector. Depending on the embodiment, the substrate 12 may comprise a metal core, epoxy or other PCB that can provide predetermined vertical and horizontal heat dissipation characteristics. Segmentation lines 16 are shown where the substrate 12 will be singulated to form the strips.

Optical couplers can be disposed in an optical coupler sheet 20, which can be a molded sheet, such as plastic, forming an array of optical couplers 22. The sheet 20 may be coated with a reflective film. Segmentation lines 24 are shown. Each LED is positioned in an optical coupler 22 to ensure almost all light injected into a light guide will be reflected until it reaches the bottom edge, also referred to as an exit aperture, of the light guide. The optical couplers 22 may comprise one or more optical elements including non-imaging dielectric TIR concentrators, such as CPC (compound parabolic concentrators), CECs (compound elliptical concentrators), CHC (compound hyperbolic concentrators), tapered, or untapered, light pipes, segmented concentrators, other geometry concentrators, one or more lenses or other optical elements, for example. Depending on the embodiment, the optical couplers 22 may be nominally equal or have different configurations. For example, optical couplers may have different profiles in the direction of the luminaire and/or perpendicular to the luminaire. For example, the optical couplers 22 may be rotationally symmetric, or have elliptical triangular, square, hexagonal, or multi-segment cross-sections perpendicular to the beam direction.

The optical couplers 22 may be integrally formed or configured from solid transparent material and solely rely on TIR or may be partially or fully reflectively coated on one or more surfaces. In a different embodiment, the optical couplers may be hollow, reflectively coated non-imaging optical couplers. A hollow reflector has the benefit of a shortened length over a dielectric collimating optic for the same collimation angle.

A phosphor sheet 28 converts the blue or ultraviolet LED light to another wavelength emission spectra which may be configured to be perceived as white light by the human eye. The characteristics of the phosphor sheet 28 may be varied depending on the peak wavelength of the LEDs, the desired correlated color temperature (CCT) or spectral power distribution of the light, and other factors. Segmentation lines 30 are shown. The phosphor sheet 28 is segmented into strips or plates that are disposed in proximity to the top surfaces of the LED chips.

In an alternative embodiment, the phosphor sheet 28 could be formed as three dimensional structures (e.g., hemispherical plates) and positioned in proximity to the LED chips within the optical couplers 22 to reduce high temperature effects on the phosphor.

The electrodes of bare LED chips, or the electrodes of submounts on which the bare LED chips are mounted, are operatively disposed to the PCB pads 14. Operative disposition may be performed by one or more of ultrasonic bonding, gluing, gluing with conductive adhesive, soldering, wire bonding, ball bumping or other operative interconnection. The LEDs may be flip chips, vertical chips (using a wire bond for the top LED electrode), horizontal non-flip with wirebonding to anode and cathode, or other type of chip.

The substrate 12, optical coupler sheet 20, and phosphor sheet 28 may be separated by sawing, routing, perforating, snapping, etching or otherwise, for example. The separation may be facilitated via predetermined breaking lines, also referred to as singulation lines, for example. The resulting strips/plates may be employed, for example, as shown in FIGS. 3A to 3C to form an LED strip 32.

Figure 3A:
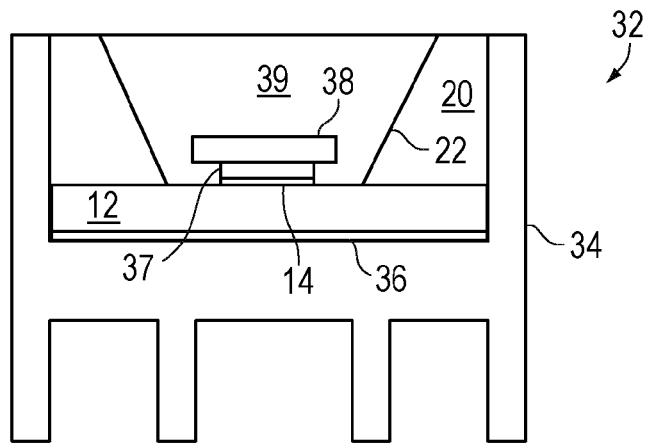
FIG. 3A illustrates a cross-sectional side view of an LED strip for a luminaire according to embodiments of the present technology.

The embodiment illustrated in FIG. 3A comprises an extruded aluminum heat sink strip 34, having extended cooling surfaces, which forms a support structure for the LED strip 32. A thermal adhesive layer 36 is applied to the heat sink strip 34, and the substrate 12 (having the LED chips 37 mounted thereon) is adhered to the layer 36. A phosphor layer 38 may be disposed in form of plates, sheets, from a slurry or otherwise, which may be flat or curved, are affixed over the top surfaces of the LED chips 37 by an adhesive, such as silicone 31. The optical coupler sheet 20 strip is then affixed over the LED chips 37. Assuming the optical couplers 22 are hollow, the openings in the optical couplers 22 are then filled with a high index silicone 39 or other encapsulant. One or more phosphor layer 38 formed from a variety of phosphor sheets having various characteristics can be utilized in this configuration either on top of, or proximate to, the LED chips to achieve the desired uniform chromaticity and color rendering index (CRI) along the strip 32, since the characteristics of a phosphor layer 38 can be matched to the characteristics of each LED chip 37.

Figure 3B:
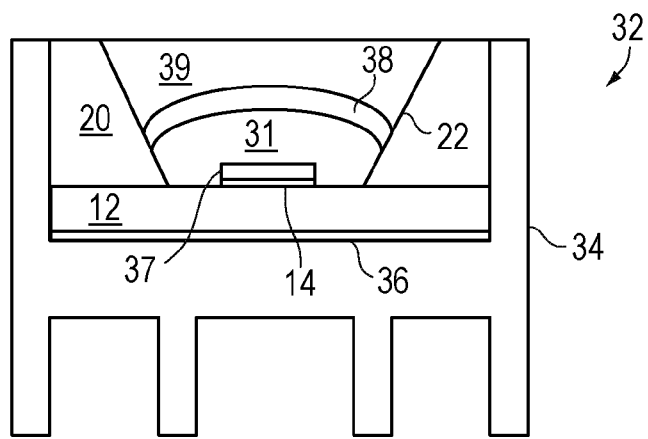
FIG. 3B illustrates a cross-sectional side view of an LED strip for a luminaire according to embodiments of the present technology.
Figure 3C:
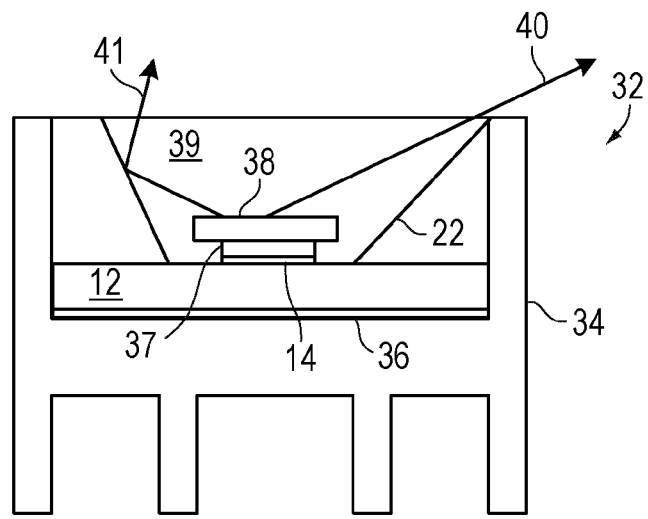
FIG. 3C illustrates a cross-sectional side view of an LED strip with an asymmetrical optical coupler for a luminaire according to embodiments of the present technology.

In FIG. 3B, a curved phosphor layer 38 is separated from the LED chip 37 by silicone 31, which greatly reduces the thermal requirements of the phosphor layer 38. Silicone 31 may be disposed into the optical coupler 22, followed by placement of the phosphor layer 38 over the LED chip 37. The phosphor layer 38 may instead be deposited as a powder or in a liquid binder. Preformed phosphor layer 38 may allow for predetermined color control.

In a different embodiment, the phosphor is uniformly deposited on the LED chips 37 or is mixed into the encapsulant (silicone 39), and the phosphor sheet 28 is not required.

In one embodiment, the phosphor is a Ce:YAG phosphor, which can produce white light when provided in adequate amounts to convert light from blue LED chips. The white light generated is then collimated by the optical couplers 22.

Other phosphors may be used to achieve similar color temperatures, such as TAG phosphors. In order to achieve warmer color temperatures in the range of 2800K-4100K, red phosphors may be added to the Ce:YAG phosphor, such as nitride phosphors.

According to an embodiment, the LED chips may emit ultraviolet light, which is then converted by a mixture of wavelength-conversion materials that produces blue through red light to achieve a desired chromaticity of light. The desired chromaticity of light, which is normally classified as white, is then collimated by the optical couplers 22.

In one embodiment, the optical couplers 22 are dielectric compound parabolic concentrators. Each optical coupler is disposed and configured to collect substantially all of the light from one or more LEDs and at least partially collimates light as it passes through the optical coupler by narrowing the solid angle of the propagation directions of light. Light exiting the exit aperture of an optical coupler diverges into a smaller solid angle than light received at an entrance aperture of the optical coupler. Depending on the embodiment, the opening angle of a beam of light exiting an exit aperture may be as narrow as +/−30 degrees or less, for example. Sufficient collimation is required to reduce non-absorptive losses of light in the light guide. It is noted that these and other considerations can further depend on the wavelengths of the light provided at the entrance aperture of the optical coupler as noted herein. Depending on the embodiment, an optical coupler may be about 2 mm wide and 3 mm tall if used with a 500 μm LED die, approximately 6 mm wide and 8 mm tall if used with small LED packages, or have other dimensions, for example.

According to an embodiment, as shown in FIG. 3C, an optical coupler may be asymmetrically configured to direct more light into one portion of space than in another with respect to corresponding optical axes and thereby provide light from the optical coupler having an asymmetrical light-emission pattern. Depending on the configuration of other components of the luminaire, for example the length and cross sections of the light guide, an asymmetrical light-emission pattern from an optical coupler may be partially or fully preserved, and may aid in providing a luminaire with predetermined photometric properties that may suit predetermined illumination applications. Asymmetric optical couplers may provide for tailoring of photometric output profiles for certain applications. It is noted that such asymmetry may be achieved via suitable asymmetric configuration of other components of the luminaire including the light pipe and/or the optical extractor, for example.

Figure 3D:
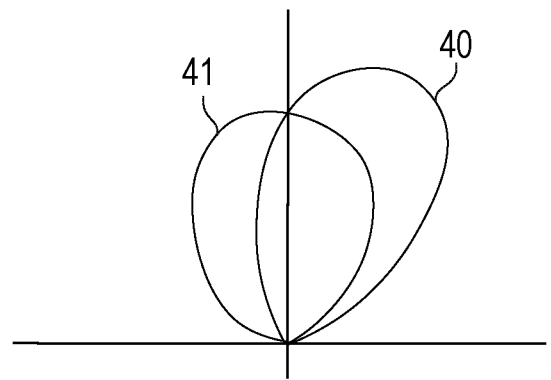
FIG. 3D illustrates light emission-patterns of the LED strip of FIG. 3C.

The asymmetry in the cross section 22 of the optical coupler in FIG. 3C will result in an asymmetric beam distribution at the exit of the optical coupler. FIG. 3D illustrates an example asymmetric beam distribution 40 at the exit of the optical coupler. Such an asymmetric beam distribution may be partially conserved by downstream components of the optical system. Depending on the embodiment, light guides typically tend to equilibrate asymmetric beam distributions but may at least partially conserve an asymmetric beam distribution if properly configured. This may be accomplished if the light guide is of adequate short length, for example. An asymmetric optical coupler may thus be utilized to generate an asymmetric light-emission pattern, which may be employed in luminaires for asymmetric lighting applications, for example, for wall washing, track lighting or other applications.

Another embodiment includes a provision for a non-planar mounting surface to be created below the LED so that the normal axis of emission from the LED is tilted from the nominal perpendicular direction in either of, or in combination, the altitudinal or azimuthal directions. This provision also provides a means to tailor the far field emission from the optical couplers that will ultimately be translated into the final emission profile at the bottom edge of the light guide.

According to an embodiment, the width of the completed LED strip (or LED line source), including the heat sink strip 34, may be up to one or more centimeters. According to some embodiments, the exit aperture of the optical coupler 22 substantially matches the width of the edge of the light guide, also referred to as the entrance aperture of the light guide. Such a configuration may be effective when the optical coupler and the light guide are integrally formed or their alignment can be accurately determined during manufacture or assembly, for example. According to some embodiments, the exit aperture of the optical coupler 22 is narrower than the entrance aperture of the light guide. Such a configuration may be effective when the optical coupler and the light guide are modularly formed and their alignment needs can be controlled via suitably accurate interconnect systems (not illustrated) to aid mitigate effects of misalignment.

Figure 4:
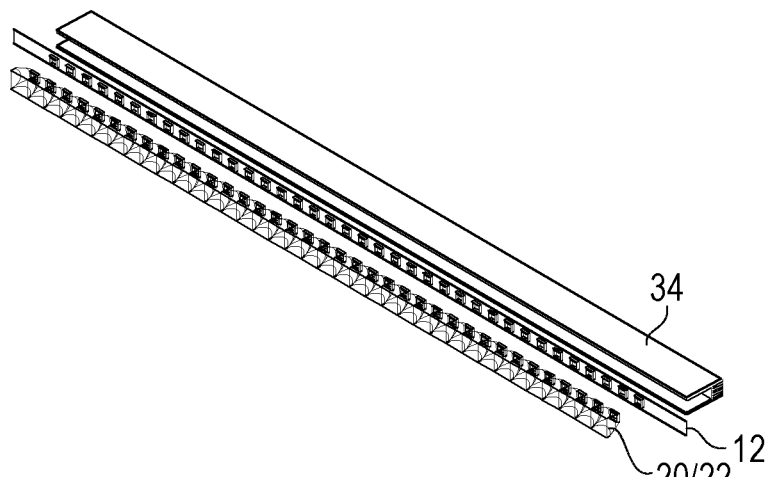
FIG. 4 illustrates an exploded view of an elongated aluminum heat sink, a printed circuit board (PCB) strip having bare LED chips or LED packages mounted on it, and a strip of optical couplers for the LEDs, where the completed structure is optically coupled to the long edge of a light guide for a luminaire according to embodiments of the present technology.

FIG. 4 illustrates an exploded view of the aluminum heat sink 34, the substrate 12 having a plurality of LEDs thereon, and a plurality of optical couplers 22 which may be integrally formed as an optical coupler sheet 20.

Figure 5A:
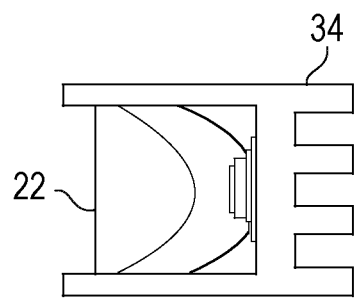
FIG. 5A illustrates a cross-sectional side view of an LED strip for a luminaire according to embodiments of the present technology.
Figure 5B:
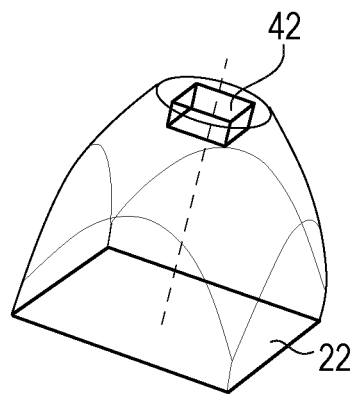
FIG. 5B illustrates a perspective view of the optical coupler of FIG. 5A.
Figure 5C:
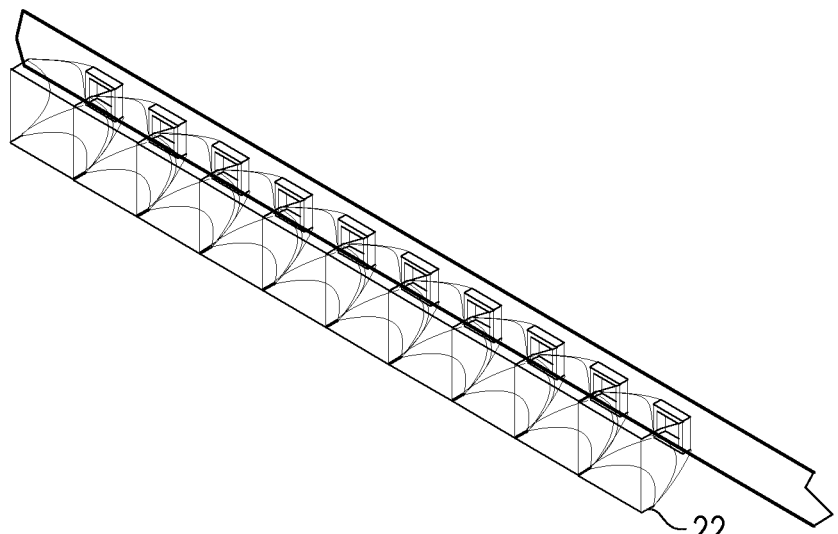
FIG. 5C illustrates a perspective view of a linear strip of optical couplers, each optical coupler being identical to that of FIG. 5B.

FIGS. 5A to 5C show some examples of optical couplers. It is noted that other example optical couplers may have other configurations, for example an optical coupler may be configured as a truncated cone or pyramid. Example truncated pyramid optical couplers may have a square or other cross section perpendicular to an optical axis. As illustrated in FIG. 5B, for example, the optical couplers 22 have a receiving opening 42 within which the LED chip 37 or LED package can be disposed. The receiving opening 42 may be designed to maximize extraction efficiency out of the LED chip 37 or LED package. The void between the LED chip 37 and the collimating optic may be filled with optical encapsulation material such as silicone to maximize light extraction efficiency.

FIGS. 5A to 5C illustrate the use of a string of optical couplers 22, also referred to as a two-dimensional configuration of optical couplers 22, for use in an LED strip 32. Depending on the embodiment, the string may be configured to provide collimation power in the direction of the LED strip 32 and perpendicular to it. Optical couplers 22 and/or a string thereof may be formed through injection molding as separate optical couplers or in groups of connected optical couplers (up to the length of the luminaire). Depending on the embodiment, adjacent optical couplers in a string of optical couplers 22 as illustrated in FIG. 5C or other arrangement of optical couplers 22 may be optically coupled with, or decoupled from one another to maintain transmission of light at the abutting interfaces between them below, at or above a predetermined level. Such configuration may depend on whether the optical couplers have a cavity or solid bulk configuration and whether they rely on total internal reflection and/or mirrored surfaces.

According to some embodiments, adjacent optical couplers may be optically isolated or coupled to provide predetermined collimation of light within one or more planes parallel to the optical axes of the optical couplers. Depending on the embodiment, adjacent optical couplers may be optically coupled via suitable configuration of abutting interfaces, disposition of suitable material between adjacent optical couplers, integral formation or otherwise optically coupled. Optical decoupling may be achieved via disposition with formation of suitably sized gaps between individual optical couplers, or disposition of suitable reflective material such as films, layers, coatings or interjecting substances between or on abutting interfaces of adjacent optical couplers. Depending on the embodiment, optical couplers may be integrally formed into lines or other groups (not illustrated) of adjacent optical couplers. Depending on the embodiment, a luminaire may comprise equal or different numbers of optical couplers within different groups of optical couplers.

Figure 5D:
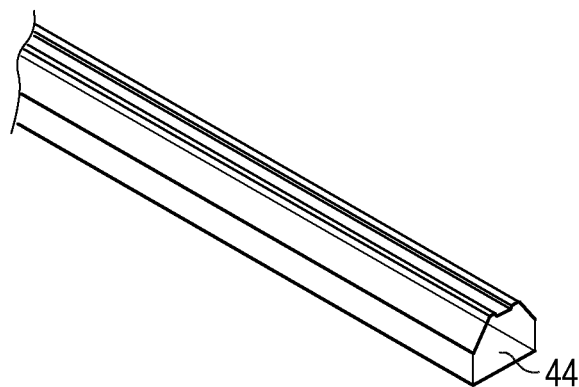
FIG. 5D illustrates a perspective view of an integrally formed elongate optical coupler for a luminaire according to embodiments of the present technology.

FIG. 5D illustrates a one-dimensional optical coupler 44 with collimation power only in the direction perpendicular to the LED strip 32. Such an optical coupler 44 may be simply formed through extrusion to any desired length.

Figure 6:
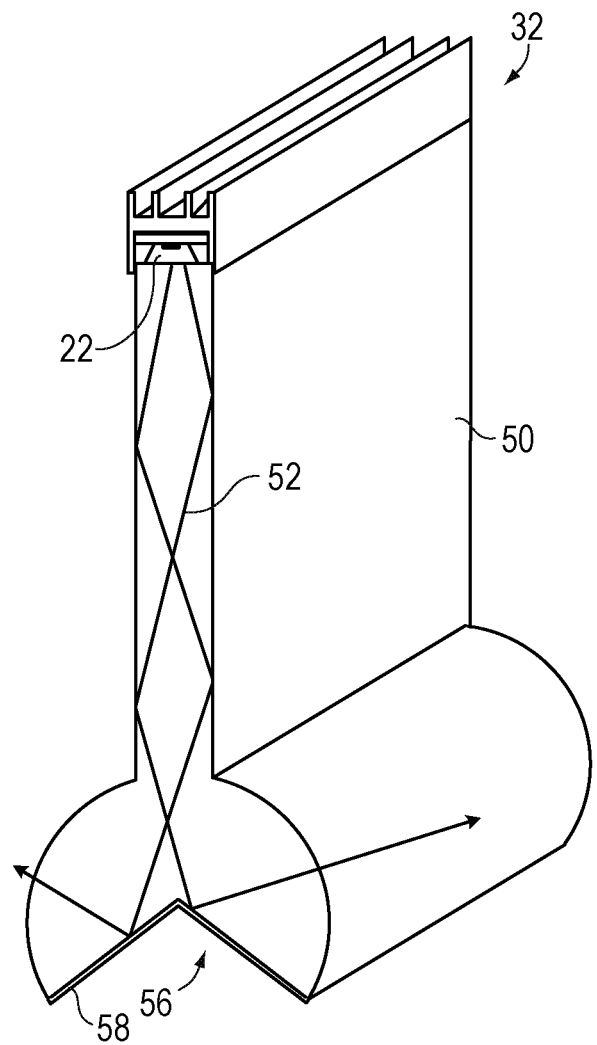
FIG. 6 illustrates a cross-sectional perspective view of a portion of a luminaire according to embodiments of the present technology.

FIG. 6 is a cross-sectional perspective view of a small portion of an acrylic light guide 50, having the LED strip 32 mounted to its upper edge. An adhesive silicone layer, having the appropriate index of refraction, may be used to couple the light into the light guide 50.

In one embodiment, to provide approximately 5000 lumens to replace a 2×4 foot fluorescent fixture, are about 50, 1 mm×1 mm LED chips, which may be packaged, chip-on-board, or otherwise configured high brightness LED chips operatively disposed equidistantly along a four foot LED strip 32. In this case the average distance between the LED chips, also referred to as pitch, amounts to about 24 mm. Accordingly, a luminaire configured to replace a typical fluorescent 2 foot by 2 foot troffer needs to generate about 3000 lumens, with a commensurate number of LED chips. The number of LED chips required depends on the luminous flux requirement of the system, the system's optical efficiency, and the performance of the LED to be utilized. If more light is required to be emitted from a luminaire, LED chips may be disposed in two or more parallel rows of LED strips 32 or otherwise grouped. Depending on the embodiment, such groupings of LEDs may determine altered geometries and dimensions of the optical coupler, light guide, optical extractor and/or other components of a luminaire. It is important to mix the light from the LED chips to obtain good brightness and color uniformity along the length of the light fixture.

According to one embodiment, a luminaire of approximately 1200 mm length is configured with approximately 100 medium brightness LEDs (such as Nichia NS2L-157 devices) to provide approximately 5000 lumens (lm) of luminous flux. Those devices can be placed on a single PCB strip at a spacing of about 12 mm. Such or other luminaires described herein may be configured for suspension from a ceiling.

According to an embodiment, a luminaire is configured as a replacement for a 2 foot or 4 foot long fluorescent tube. For example, the luminaire can have a suitable length for placement in the housing of a two feet by two feet or two feet by four feet troffer. In order to provide the flux of a 4 foot fluorescent lamp of about 3000 lm approximately 30 LED, for example 1 mm by 1 mm LEDs of 100 lm each, may be used spaced apart at approximately 40 mm per luminaire.

A luminaire according to an embodiment may be configured to replace a 2 foot by 2 foot troffer. In such a luminaire the LEDs may be disposed in two rows each having an approximate length of 600 mm. Each row can then be coupled with an elongate system as described herein. To be able to provide for example 1500 lm output from each row, a certain number of LEDs per row are required with each row having LEDs spaced at a predetermined distance, for example. Nominally, for example, 30 LEDs with a light output of 50 lm each spaced at 20 mm per row may provide 1500 lm light input into the optical system of each row. Considering inefficiencies due to optical, electrical, ageing and other effects, for example, about 30% to about 100% more light input per row may be required to account for such inefficiencies and achieve and maintain a light output of about 1500 lm per row. Consequently, a corresponding example luminaire may be configured with 60 LEDs, each providing 50 lm, spaced at 10 mm per row.

It is noted that the specific number of LEDs used in such a luminaire may depend on ageing properties of the LEDs and the degree to which an LED drive system can compensate for such properties. Ageing properties of LEDs can include decrease and/or increase of LED efficacy, light output, efficacy, probability of failure and/or other properties that can vary with time of operation of an LED. Such luminaires need to be used in combination with compatible LED electrical drive systems in order to be able to maintain the overall flux provided by the luminaire within desired tolerances.

According to some embodiments, the luminaire is configured to generate light of a desired chromaticity including white light from light emitted by one or more of amber, red, green, blue and other visible color. The luminaire may include nominally white or off-white LEDs or LED light sources in combination with other visible LEDs such as red, amber or green. Depending on the embodiment, such luminaires may optionally include wavelength-conversion material and/or employ shorter wavelength LEDs such as violet and/or ultraviolet emitting LEDs. Depending on the embodiment, luminaires that are configured to emit light of a predetermined chromaticity and that employ LEDs of various chromaticities, require sufficient mixing of the light from different color LEDs along the optical path of the luminaire, for example in the light guide, the optical coupler, the optical extractor and/or other components of the luminaire. Color mixing in the light guide 50 is important for color uniformity along the length of the luminaire. The luminaire may include light sources, including nominally white or off-white in combination with other LEDs.

Depending on the embodiment, wavelength-conversion material may be deposited at one or more locations within the luminaire, for example within the LED strip 32, at a reflective end portion of the light guide 50 or in other locations, as described herein. The location of wavelength-conversion material within the luminaire may affect the configuration of one or more components of the luminaire to ensure light of shorter wavelengths may propagate along predetermined optical paths, or be dispersed, refracted, reflected, absorbed or otherwise manipulated in a predetermined manner to achieve a predetermined function of the luminaire. For example, wavelength-conversion material that is disposed within the optical extractor may require altering the configuration of the reflective interfaces of the optical extractor, the choice of material used to make optical coupler, light guide, optical extractor, whether or not one or more surfaces of the light guide may need to be coated with certain materials to maintain the function of the light guide, and other aspects.

The collimated light 52 from the LED chips reflects off the parallel walls of the light guide 50 by TIR and mixes within the light guide 50 to achieve good uniformity at the distal portion of the light guide. The width (the direction in which light is guided) of the light guide 50 is designed to achieve adequate uniformity at the exit aperture of the light guide. The width of a typical light guide 50 will be on the order of 2 to 20 centimeters.

In another embodiment, the light guide 50 is hollow with a reflective inner surface. The inner surface may reflect by TIR or be coated with a reflective material. The material forming the hollow light guide structure may itself be reflective, such as polished aluminum.

The optical couplers 22 in the LED strip 32 restrict the angle of light entering the light guide 50 (e.g., to within +/−40 degrees) so that TIR occurs within the light guide. The thickness of the light guide 50 should match the thickness of the optical couplers 22 (e.g., less than 1 cm) to accept all the light. As illustrated in FIG. 5, the LED strip 32 is disposed on a carrier 34, which can be an extrusion. The carrier 34 may be configured to provide a mating portion for registering and operative attachment of the LED strip 32 and the light guide 50 to ensure accurate relative positioning. Such attachment may be durably secured using one or more of a compression fit, welding, soldering, gluing, screwing or other chemical, mechanical or other attachment. Depending on the embodiment, a narrower light guide may better mix light and provide a narrower exit aperture for light emission from the end of light guide, resembling the light emitted from a one dimensional linear light source, also referred to as a virtual light emitting filament.

The light 52 impinging on the reflector portion 56 is reflected outwardly and away from the light guide 50. Depending on the embodiment, the reflector portion 56 may be configured to emit light upwards, downwards or both upwards and downwards. If the desired angle of the reflector portion 56 does not result in TIR, a reflective film 58 may be deposited on the angled surface of the reflector portion 56. According to an embodiment, wavelength-conversion material is disposed at the reflector portion 56 (instead of proximate to the LED chips) and a reflective film is disposed over the wavelength conversion material. In another embodiment, wavelength-conversion material may be disposed on the exit surface or the optical extractor or be placed a short distance away from the light-exit surface in a remote layer that will exhibit a lower surface luminance, thus softening the appearance of the light source.

Other wavelength converting materials, such as quantum dots, may also be used. The light-exit surface of the reflector portion 56 may be rounded, faceted or have other shapes to provide a predetermined TIR and light extraction from the light guide 50.

The angle of the reflector portion 56 is such that no or only a relatively small amount of the light is emitted from the light guide 50 downwardly to avoid glare and the appearance of non-uniform brightness.

Figure 7:
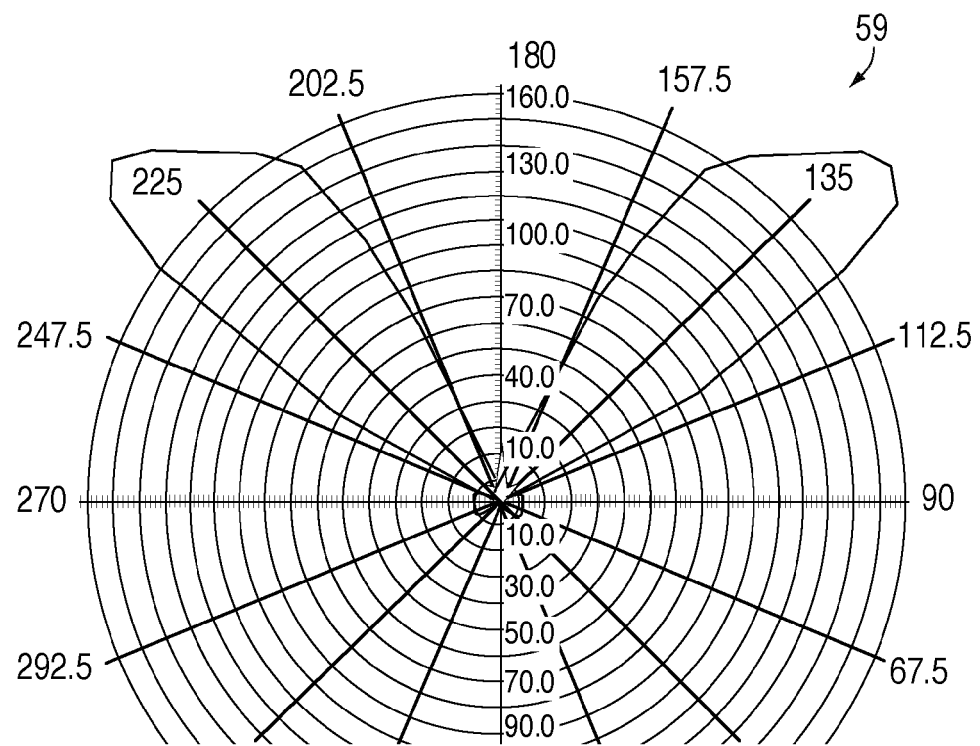
FIG. 7 illustrates a substantially symmetrical light-emission pattern of a luminaire according to embodiments of the present technology.

Depending on the embodiment, a luminaire may be configured to emit light with different light-emission patterns, including symmetric and asymmetric light-emission patterns. FIG. 7 illustrates an example of a substantially symmetrical light-emission pattern 59 for light emitted from a suitably symmetrical configured luminaire as illustrated in FIG. 6. Different light-emission patterns may be useful for different illumination applications.

Depending on the embodiment, light emitted from the light guide 50 may be substantially Lambertian with respect to one or more of the reflectors 56, or have other propagation patterns. A majority of the light may be redirected away from the light guide 50 and upwards toward a virtual plane intersecting the LED strip 32 and perpendicular to the optical axis of the light guide.

Figure 8A:
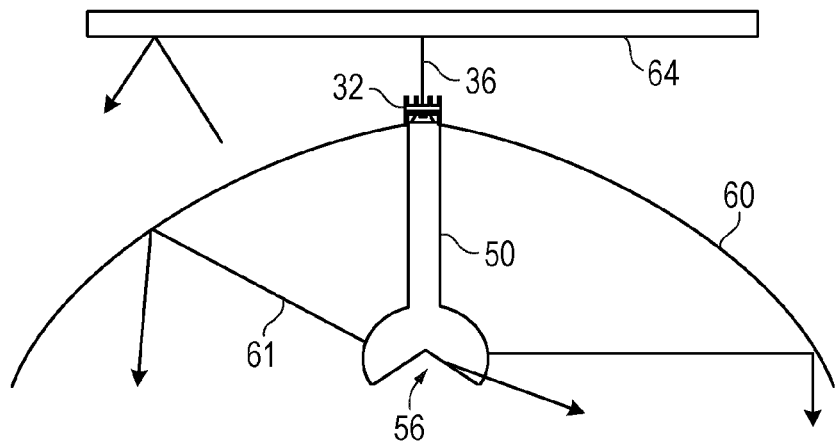
FIG. 8A illustrates a schematic cross section of a luminaire according to embodiments of the present technology.
Figure 8B:
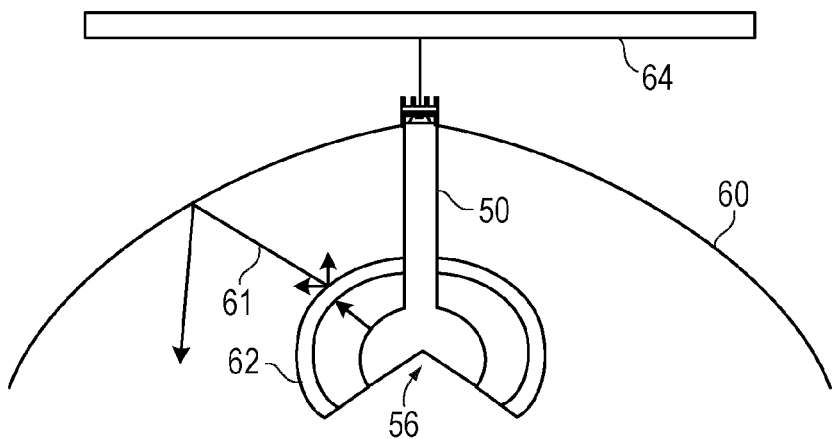
FIG. 8B illustrates a luminaire with an external light-conversion structure that is outside the bottom edge of the light guide according to an embodiment of the present technology.
Figure 8C:
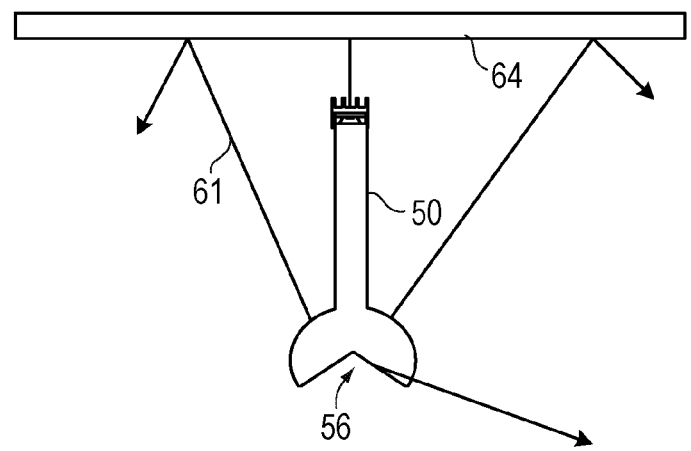
FIG. 8C illustrates a schematic cross section of a luminaire without a secondary reflector according to an embodiment of the present technology.

FIG. 8A to 8C illustrate a luminaire for space illumination from a ceiling 64. The luminaire may be suspended from the ceiling 64 by wires 66 that may be intertwined with power supply and optional data wires to the luminaire. To redirect the light downward for illuminating a room, a secondary reflector 60 is provided along the length of the light guide 50. Most of the light 61 emitted from the light guide 50 is reflected downward by the secondary reflector 60. The shape of the secondary reflector 60 determines the spread of light and illuminance on a target surface. As shown in FIG. 8A, the LED strip 32 may be external to the secondary reflector 60 so the reflector 60 does not obstruct air flow along the back surface of the LED strip 32. Depending on the embodiment, the secondary reflector 60 may be configured to provide thermal contact with the LED strip 32 to aid in the dissipation of heat generated by the LEDs. Depending on the embodiment, the luminaire may be configured to provide such thermal coupling also for modularly replaceable secondary reflectors. Depending on the embodiment, the secondary reflector 60 may form part of the heat sink for the LEDs in combination with the heat sink strip 34 (FIG. 5).

The surfaces of the secondary reflector 60 may comprise one or more segments having straight, angled, segmented, curved, involute or other shape in one or two dimensions to provide a predetermined broad or narrow emission pattern. The secondary reflector 60 may be planar. Depending on the embodiment, the secondary reflector may be configured for operation parallel to a floor. In one embodiment, the secondary reflector 60 extends approximately even with the bottom of the light guide 50 to reduce glare and to control the direction of almost all the light emitted from the light guide 50 for a smooth lighting effect over an area. The secondary reflector 60 may be configured to create a predetermined light-emission pattern. It may be configured to provide an amount of glare below, at or above a predetermined level, and/or configured to enable predetermined illumination of a floor directly below the light guide 50 or other surface as well as predetermined areas surrounding the light guide 50, for example. The secondary reflector may be configured to provide illumination with predetermined uniformity.

Depending on the use of the luminaire, the luminaire may be configured with the optical axis of the light guide 50 directed substantially perpendicular to a floor, wall or other elements of the surrounding environment depending on in what manner these elements are intended to be illuminated.

The secondary reflector 60 may allow some light to pass to illuminate the ceiling 64. This may be accomplished by perforating the reflector 60 or providing some transparency in the reflective material.

In another embodiment the secondary reflector 60 may also include some wavelength converting material that can further act to modify light emitted from the reflector portion 56 to match the desired chromaticity in the room.

In another embodiment, the collimation optic as well as the light guide 50 may be hollow with reflective inner surfaces rather than a solid piece of acrylic. In this embodiment material cost can be reduced and absorption in the light guide is avoided. Many highly specularly reflective materials are suitable for this including materials such as 3M Vikuiti™ or Miro IV™ sheet from Alanod Corporation where greater than 90% of the incident light would be efficiently guided to the reflector portion 56.

Depending on the embodiment, the wavelength-conversion material may be disposed, for example, proximate the LED strip 32 or in the optical extractor 56 as in FIG. 8B. The placement of the wavelength-conversion material 62 away from the optical extractor 56 may facilitate creation of a reduced luminance source which may be reflected from the secondary reflector 60, thereby providing softer lighting. According to an embodiment, the secondary reflector 60 may contain a layer of wavelength-conversion material. This may also provide or contribute soft, diffuse illumination. The wavelength-conversion material 62 may be deposited on one or more surfaces of the light guide or on a support structure. The support structure may be transparent, self-supporting structure. The light-converting material 62 diffuses the light as it converts the wavelengths, providing further mixing of the light, to generally uniformly illuminate the secondary reflector 60.

FIG. 8C illustrates an example luminaire without an optional secondary reflector. Such a luminaire may provide illumination substantially to a ceiling, table or other ambient surface only from which light is then reflected into the ambient for indirect lighting. As an indirect pendant fixture, this design can provide low glare with high efficiency light coupling to the ceiling 64 to create ambient illumination.

Figure 9:
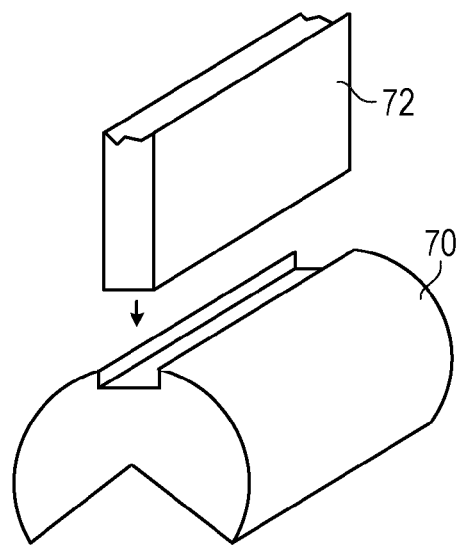
FIG. 9 illustrates a modularly configured light guide and optical extractor for a luminaire according to embodiments of the present technology.

FIG. 9 illustrates how the optical extractor 70 may be modularly configured separately from the light guide. The optical extractor 70 may be affixed to the bottom edge of a rectangular light guide 72 employing a suitably optically transparent coupling material having a matched index of refraction such as silicone. The optical extractor 70 may be held in place by the coupling material, mechanical interference, a friction fit or otherwise, for example. This configuration may be employed to permit choosing from a selection of differently configured optical extractors that provide different light-emission patterns better suitable for a particular lighting application. The optical extractor 70 may also be provided with a variety of distribution optics so that they can be joined to a common light guide 72 in a completely modular fashion to suit the mounting height and lighting requirements of the space.

Figure 10:
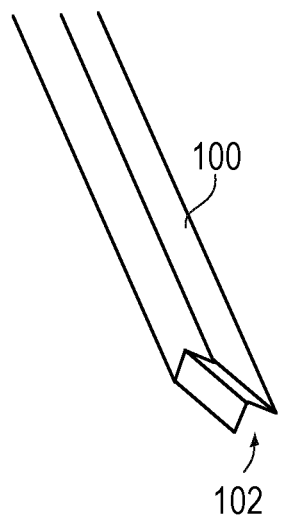
FIG. 10 illustrates a perspective view of the distal portion of a light guide with an integrally formed optical extractor configured with a V-groove reflector portion for a luminaire according to embodiments of the present technology.

As an alternative to the light guide design of FIG. 6, FIG. 10 illustrates the distal portion of a solid light guide 100, such as formed of a transparent acrylic, with an inverted V straight reflector portion 102 that directs the light from the LED strip 32 (FIG. 5) upward and away from the light guide 100. In this embodiment, the angle of the inverted V reflector portion 102 is constrained by the collimation of the light and the requirement to overcome TIR to extract a maximum amount of light out of the light guide 100. If the angle becomes too shallow, an unacceptable amount of light will be reflected back into the light guide 100, as well as TIR conditions may no longer be met.

Figure 11:
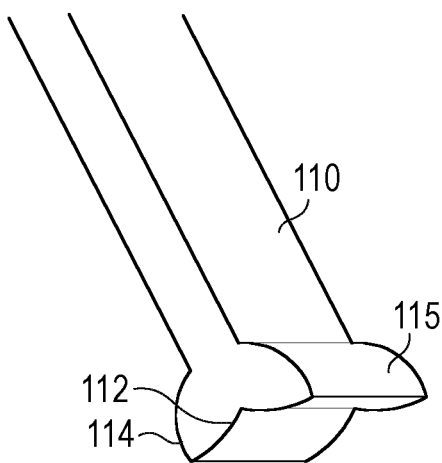
FIG. 11 illustrates a perspective view of the distal portion of a light guide with an integrally formed optical extractor configured with a hyperbolic reflector portion and cylindrically configured light-exit surfaces for a luminaire according to embodiments of the present technology.

FIG. 11 illustrates the distal portion of a light guide 110 with a hyperbolic reflector portion 112 that provides further beam shaping. The light-exit surface is a cylindrical optic 114 that reduces TIR to maximize light extraction out of the light guide 110. The reflector portion 112 can take other shapes, such as straight, spherical, elliptical, hyperbolical, parabolical, other aspherical shapes, segmented, or combinations of shapes in order to achieve the desired extraction efficiency and beam distribution.

The shape of the light-exit surface 115 is not limited to include circular segments, but may also comprise aspherical, elliptical, straight or other segments and combinations thereof as is desirable in the optical design of the system.

Figure 12:
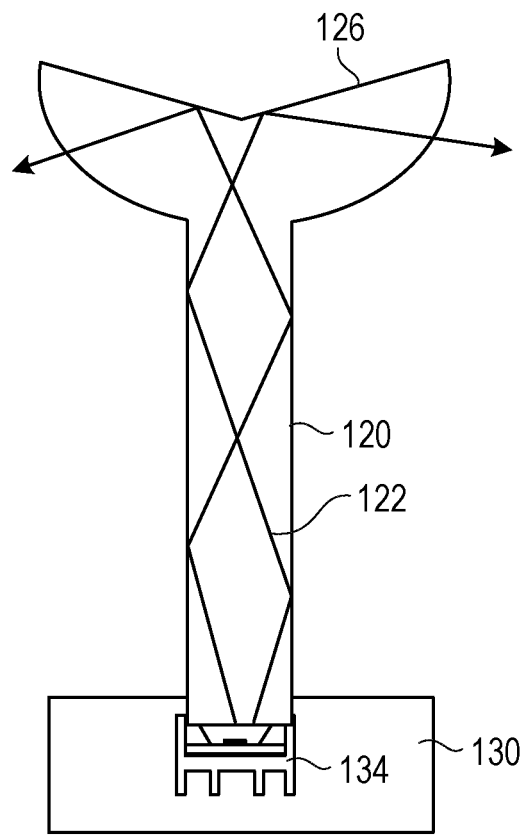
FIG. 12 illustrates a schematic cross section a luminaire according to embodiments of the present technology.

FIG. 12 illustrates a cross-section of a light guide 120 that can be used as a desk luminaire, for example. Light rays 122 from a plurality of LEDs are shown mixing in the light guide 120. An optical extractor 126 reflects the light downward and outward by TIR or reflection from a reflective film. The desk luminaire may optionally include a secondary reflector (not illustrated) disposed and suitably configured to at least partially surround the optical extractor so that at least a portion of the light already emitted from the optical extractor is further directed downwards toward a table to reduce glare or provide other predetermined lighting. A base 130 may include a switch, dimmer, heat sink or other components. The base 130 may be configured to provide predetermined thermal coupling to the environment and may be used as a heat sink, for example.

Figure 13:
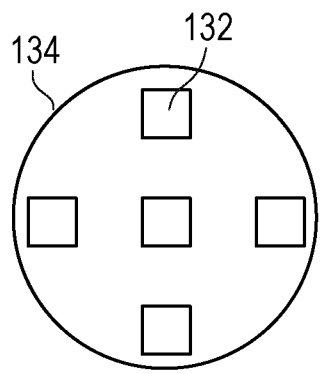
FIG. 13 illustrates an example array of LEDs configured as a light-source module for use in a luminaire according to embodiments of the present technology.

The desk luminaire of FIG. 12 has an elongate configuration perpendicular to the optical axis of the light guide. FIG. 13 illustrates an example configuration of LEDs 132 disposed on one of a plurality of substrates 134 for use in the desk luminaire. The substrate may be connected or be configured as a heat sink. The LEDs 131 may be interconnected in series and/or parallel as determined for operative connection with suitable circuitry for driving the LEDs 132.

Figure 14:
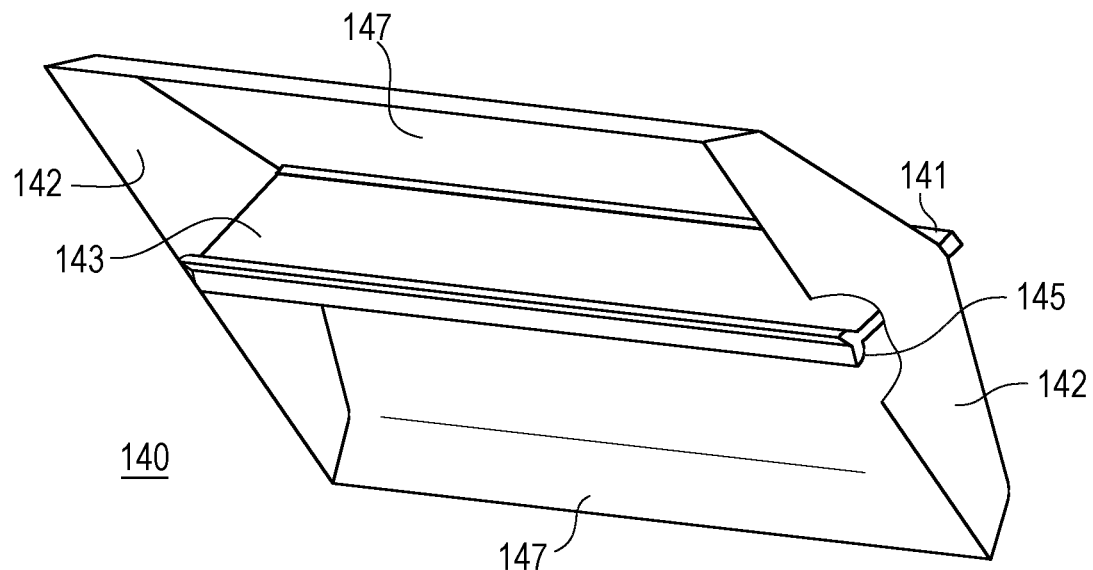
FIG. 14 illustrates a perspective view of an example luminaire according to some embodiments of the present technology.

FIG. 14 illustrates a perspective view of an example luminaire 140 according to some embodiments of the present technology. The luminaire 140 comprises a carrier 141, a light guide 143, an optical extractor 145, and a secondary reflector 147. The luminaire 140 further comprises a plurality of optical couplers and a plurality of LEDs (not illustrated). The light guide 143 and the optical extractor 145 may be integrally formed. The carrier 141 is formed of extruded aluminum and is configured to operatively couple to the secondary reflector 147 and the light guide 143. The carrier 141 further operatively supports the LEDs and the optical couplers in this example. The secondary reflector 147 is closed off at two ends by walls 142. One of the walls 142 is illustrated broken open to better show a portion of the light guide 143 and the optical extractor 145. The luminaire 140 is configured to provide a predetermined symmetrical light-emission pattern (not illustrated). The luminaire 140 can be used alone or in multiples to form a suitably sized troffer, for example. The luminaire 140 may optionally be combined with a diffusor plate (not illustrated). The diffusor plate may be configured to cover the opening of the secondary reflector and protect the optical system from dust or other environmental effects.

Figure 15:
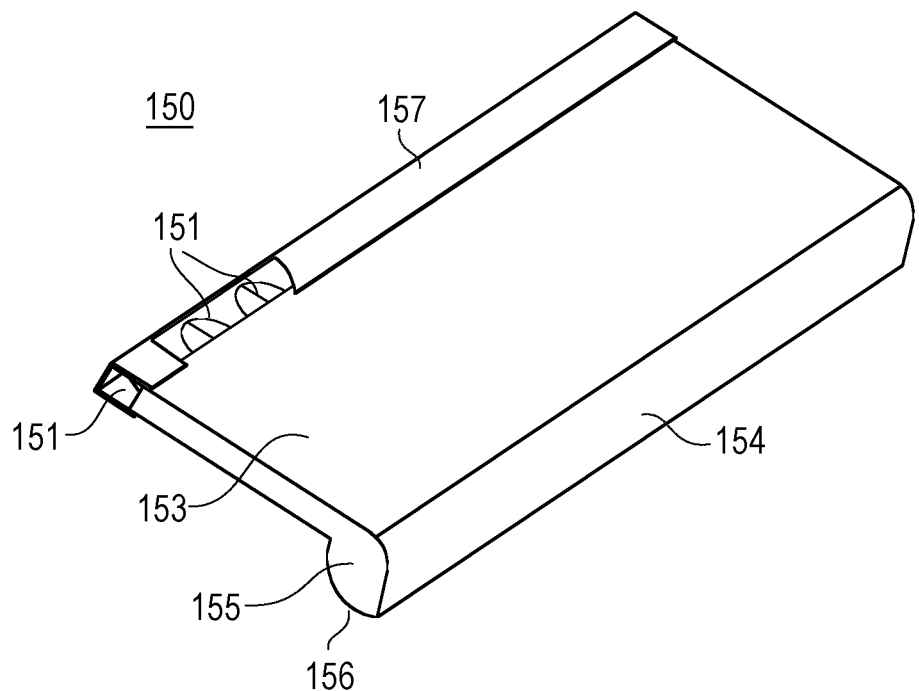
FIG. 15 illustrates a perspective view of an example luminaire according to some embodiments of the present technology.

FIG. 15 illustrates a perspective view of an example luminaire 150 according to some embodiments of the present technology. The luminaire 150 comprises a carrier 157, a light guide 153 and an optical extractor 155. The luminaire 150 further comprises a plurality of optical couplers 151 and a plurality of LEDs (not illustrated). The carrier 157 is formed of extruded aluminum and is configured to operatively couple to the light guide 153. The carrier 157 is thermally coupled with the LEDs. The carrier 157 is illustrated partially broken open to better show two of the plurality of optical couplers 151. The luminaire 150 is configured to provide a predetermined asymmetrical light-emission pattern (not illustrated). For this purpose the extractor comprises a reflective interface 154 and a light-exit surface 156, which are formed as illustrated. The reflective interface 154 and the light-exit surface 156 may be configured in a number of ways as described herein to provide a. The luminaire 140 can be used for track lighting, in under cabinet lighting, or other lighting applications where asymmetrical illumination may be employed.

The various features of the luminaires described herein may be combined in any way.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A luminaire comprising:
   a plurality of light-emitting diodes (LEDs) operatively disposed in an elongate configuration along a first direction;
   one or more optical couplers arranged along the first direction, such that the one or more optical couplers are optically coupled with the plurality of LEDs and configured to receive at least a portion of light from the plurality of LEDs, each optical coupler configured to at least partially collimate light from the plurality of LEDs;
   a light guide having a first end proximate the one or more optical couplers and a second end distal the one or more optical couplers, wherein the first end and the second ends are elongated along the first direction, such that the light guide is being optically coupled with the one or more optical couplers at the first end and is configured to receive at least a portion of light from the one or more optical couplers, wherein the light guide is configured to guide at least a portion of light from the one or more optical couplers in a forward direction from the first end toward the second end of the light guide; and
   an optical extractor optically coupled to the light guide proximate the second end of the light guide, wherein the optical extractor comprises first and second reflective interfaces that are elongated along the first direction, and first and second non-planar light-exiting surfaces that are elongated along the first direction,
   wherein the first reflective interface is arranged and configured to redirect a first portion of light from the light guide towards the first non-planar light-exiting surface in a second direction that has a component along a direction opposite the forward direction and another component along a direction transverse the first direction, and the first non-planar light-exiting surface is configured to output from the optical extractor the first portion of light along the second direction, and
   wherein the second reflective interface is configured to redirect a second portion of the light from the light guide towards the second non-planar light-exiting surface in a third direction that has a component along the direction opposite the forward direction and another component along a direction opposite the direction transverse to the first direction, and the second non-planar light-exiting surface is configured to output from the optical extractor the second portion of light along the third direction.

2. The luminaire according to claim 1 further comprising a secondary reflector operatively disposed and optically coupled with the optical extractor and configured to redirect at least a portion of light received from at least one of the first or second non-planar light-exiting surfaces of the optical extractor.

3. The luminaire according to claim 1, wherein
the plurality of LEDs are disposed in groups of one or more LEDs, each group of LEDs optically coupled with one of the one or more optical couplers, and
the light guide comprises one or more of a prismatic portion, a cylindrical portion or a conical portion.

4. The luminaire according to claim 1, wherein the light guide is configured to guide light at least in part via total internal reflection (TIR).

5. The luminaire according to claim 1, wherein the light guide is hollow and has a reflective coating on its inside providing a hollow light guide that transmits light from the first end to the second end.

6. The luminaire according to claim 1, wherein the first and second reflective interfaces are configured and arranged at corresponding angles relative to the forward direction in a symmetric manner.

7. The luminaire according to claim 1, wherein each of the first and second reflective interfaces comprises a flat portion, a curved portion or both.

8. The luminaire according to claim 1, wherein at least one of the first and second reflective interfaces is configured to redirect at least a portion of the light from the light guide via total internal reflection.

9. The luminaire according to claim 1, wherein the light guide and the optical extractor are up to two meters long.

10. The luminaire according to claim 1 further comprising one or more wavelength-conversion materials disposed at one or more locations and configured to convert light of one or more first wavelengths into light of one or more second wavelengths, and wherein one or more of the LEDs are configured to provide one or more of blue, violet and ultraviolet light.

11. The luminaire according to claim 1 wherein one or more of the plurality of LEDs are at least partially encapsulated in one or more materials having one or more refractive indices.

12. The luminaire according to claim 1 further comprising an elongate heatsink thermally coupled with the plurality of LEDs and configured to dissipate at least a portion of heat from the plurality of LEDs.

13. The luminaire according to claim 2 wherein the secondary reflector is thermally coupled with the plurality of LEDs and configured to dissipate at least a portion of heat from the plurality of LEDs.

14. The luminaire according to claim 1, wherein the optical extractor is configured to output light along the second and third directions in a symmetric manner with respect to the forward direction.

15. The luminaire according to claim 1, wherein two or more of the optical extractor, the light guide and the one or more optical couplers are one of integrally formed and detachably replaceable.

16. The luminaire according to claim 1 configured as a troffer luminaire.

17. A luminaire comprising:
a plurality of light-emitting diodes (LEDs) operatively disposed in an elongate configuration;
one or more optical couplers optically coupled with the plurality of LEDs and configured to receive at least a portion of light from the plurality of LEDs, each optical coupler configured to at least partially collimate light from the plurality of LEDs;
a light guide optically coupled with the one or more optical couplers and configured to receive at least a portion of light from the one or more optical couplers, the light guide configured to guide at least a portion of light from the one or more optical couplers from a first end toward a second end of the light guide; and
an optical extractor optically coupled to the light guide proximate the second end of the light guide, wherein the optical extractor comprises one or more light-exiting surfaces and one or more reflective interfaces, the reflective interfaces being configured to redirect at least a portion of the light from the light guide towards the one or more light-exiting surfaces, and the one or more light-exiting surfaces being configured to emit from the extractor predetermined portions of light in predetermined directions,
wherein at least one of the light-exit surfaces is configured as a portion of a cylinder of radius R, and at least a portion of one of the reflective interfaces is disposed within a portion of space defined by a notional cylinder of radius R/n, wherein the notional cylinder of radius R/n and the cylinder of radius R have collinear axes of symmetry.

18. The luminaire according to claim 17, wherein the light guide is configured to guide light at least in part via total internal reflection (TIR).

19. The luminaire according to claim 17, wherein the light guide is hollow and has a reflective coating on its inside providing a hollow light guide that transmits light along its length with predetermined light-loss properties.

20. The luminaire according to claim 1, wherein at least one of the first and second reflective interfaces is configured to redirect at least a portion of the light from the light guide via reflection off of a reflective coating.

21. The luminaire according to claim 1, wherein the first and second reflective interfaces are configured and arranged at corresponding angles relative to the forward direction in an asymmetric manner.

22. The luminaire according to claim 1, wherein the optical extractor is configured to output light along the second and third directions in an asymmetric manner with respect to the forward direction.

23. The luminaire according to claim 1 configured as a pedestal luminaire.

24. The luminaire according to claim 1 configured as a table luminaire.

25. The luminaire according to claim 1 configured as a wall wash luminaire.

26. The luminaire according to claim 1 configured as a task luminaire.

27. The luminaire according to claim 1 configured as a pendant luminaire.

* * * * *